United States Patent [19]

Maekawa et al.

[11] 4,392,577
[45] Jul. 12, 1983

[54] GLASS VIAL WITH DIAGONAL CUT LINE

[75] Inventors: Hideyuki Maekawa, Osaka; Shinji Hiramoto, Kobe; Kozo Itaya, Sakai; Kokichi Sato, Habikino; Hirotaka Nishida, Ibaraki, all of Japan

[73] Assignees: Shionogi & Co., Ltd.; Taisei Kako Co., Ltd., both of Osaka, Japan

[21] Appl. No.: 253,018

[22] Filed: Apr. 10, 1981

[51] Int. Cl.³ .............................................. A61J 1/00
[52] U.S. Cl. .................................................... 215/32
[58] Field of Search .......................... 215/32, 33, 34; 206/601

[56] References Cited

U.S. PATENT DOCUMENTS

| | | | |
|---|---|---|---|
| 572,126 | 12/1896 | Sauage | 215/33 |
| 2,896,807 | 7/1959 | Shaw | 215/32 |
| 3,154,230 | 10/1964 | Langloys | 215/32 X |
| 4,254,883 | 3/1981 | Urban | 215/32 |

FOREIGN PATENT DOCUMENTS

| | | | |
|---|---|---|---|
| 1307591 | 12/1964 | France | 215/32 |
| 1188555 | 4/1970 | United Kingdom | 215/32 |

Primary Examiner—William Price
Assistant Examiner—Sue A. Weaver
Attorney, Agent, or Firm—Birch, Stewart, Kolasch & Birch

[57] ABSTRACT

A vial, particularly a glass vial, having a diagonally disposed cut line which is defined by off-set indentations in the neck portion of the vial.

6 Claims, 11 Drawing Figures

GLASS VIAL WITH DIAGONAL CUT LINE

BACKGROUND OF THE INVENTION

The present invention relates to a vial, particularly a glass vial, wherein the plane along the narrowest part of the neck portion of the vial obliquely crosses at a given angle with respect to the axial line of the vial thereby decreasing the production of broken glass pieces which tend to fall into the vial during the cutting operation of the branch pipe portion from the main body of the vial.

In a glass vial such as that used for hypodermic purposes in medical applications, it is known that the cutting operation of the vial branch pipe portion causes the glass to be broken to pieces, whereby some of the broken pieces drop into the vial body thereby polluting the contents thereof. It is almost impossible, under the existing circumstances, to completely prevent the glass from being broken into pieces. Some attempts have been already performed to prevent, to a certain degree, the glass from being broken into pieces or to decrease the broken glass pieces to some extent. For example, a positive pressure condition has been produced within the vial by some means; a scratch for cutting operation is provided in advance at one point of the vial neck portion (one-point-cut vial); a tackifier material is applied upon the inner face and/or the outer face of the vial neck portion; one or more swellings are formed in the branch pipe portion of the vial; the cutting position of the vial is varied; a special vial cutter is used; and so on.

However, these known methods required special incidental facilities to employ such methods. The molding operation of the vial is difficult to perform or the results were not sufficient. According to the experiments conducted on the above-described one-point-cut vial (2 ml in capacity) by the present inventors, the degree of glass was recorded as shown in Table 1.

TABLE 1

| Experiments No. | Vials 2 ml One-Point-Cut Size Of Broken Pieces | | |
|---|---|---|---|
| | 10~24μ | 25~49μ | 50μ~ |
| 1 | 2 | 1 | 0 |
| 2 | 0 | 0 | 0 |
| 3 | 5 | 1 | 0 |
| 4 | 3 | 2 | 1 |
| 5 | 1 | 0 | 0 |
| 6 | 3 | 0 | 0 |
| 7 | 1 | 0 | 1 |
| 8 | 2 | 0 | 0 |
| 9 | 2 | 1 | 0 |
| 10 | 0 | 1 | 0 |
| 11 | 3 | 0 | 1 |
| 12 | 2 | 1 | 0 |
| 13 | 0 | 0 | 0 |
| 14 | 11 | 1 | 3 |
| 15 | 2 | 0 | 2 |
| 16 | 9 | 5 | 0 |
| 17 | 3 | 1 | 0 |
| 18 | 5 | 1 | 1 |
| 19 | 10 | 2 | 0 |
| 20 | 1 | 1 | 0 |
| $\bar{X}$ | 3.25 | 0.9 | 0.45 |
| Total $\bar{X}$ | | 4.6 | |

After the detailed observation of the broken glass pieces caused during the cutting operation of the vial, the present inventors have found out that more broken glass pieces are produced on the compression side of the vial to be cut, instead of the on the tensile side thereof. Namely, when the branch pipe portion 2 of the vial is depressed as shown in FIG. 1 from one side to the other side along the direction of a dotted-line arrow, and is cut from the vial body 1 at the narrowest part 3 of the neck portion along the one-dot chain line A–B, more broken glass pieces are caused on the compression side A than the tensile side B. This fact indicates that innumerable break lines are caused, thus resulting in roughness in the cut face (FIG. 3) on the compression side as compared with the cut face (FIG. 4) on the tensile side as shown in FIG. 3 and FIG. 4, each showing an enlarged plane view of the cut face of the respective sides. Namely, the cut face on the tensile side B of the neck portion 3 shown in FIG. 4 indicates filed scratches 4 only, which are normally provided on the narrowest portion 3 of the vial, and also indicates relatively clear breaks. Fine, irregular break lines 5 and distorted lines 6 are produced across a considerably wide portion of the cut face, as shown in FIG. 3, on the cut face of the compression side A of the vial, thus indicating many broken glass pieces produced during the cutting operation of the vial. Therefore, it can be easily imagined that the broken glass pieces can be prevented, to a certain degree, by utilizing a cutting method which causes the stress, produced during the cutting operation of the vial branch pipe portion, to function as tensile stress with respect to the neck portion of the vial. However, both end portions cannot be cut along the axial line of the vial by the mutual pulling operations of the end portions. The present inventors have developed a vial, after examining the shape of the neck portion, wherein the stress produced during cutting may be operated in the pulling direction as much as possible. Namely, the present invention relates to a glass vial, wherein the plane along the narrowest part of the neck portion of the vial whose branch pipe portion is to be cut obliquely crosses at a given angle with respect to the axial line of the vial.

SUMMARY OF THE INVENTION

Accordingly, an object of the present invention is to provide a glass vial having a narrow neck portion which eliminates disadvantages inherent in the conventional vials as described hereinabove, and decreases the production of the broken glass pieces and the contamination of the contents of the vial during the cutting operation of the vial branch pipe portion at its narrowest portion.

Another object of the present invention is to provide a glass vial wherein a cut line for cutting the branch pipe portion of a vial is obliquely provided at a given angle with respect to a horizontal reference line, normal to a central axial line, of the main body of the vial.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
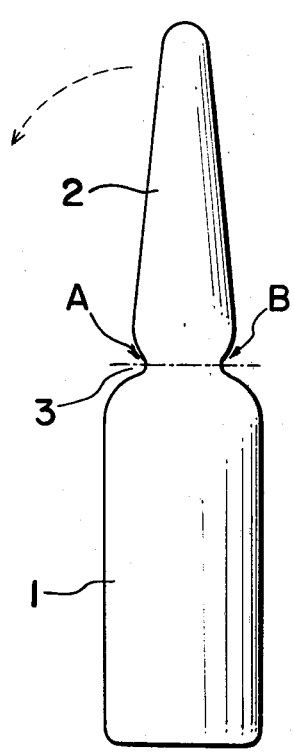
FIG. 1 is a side view of a known vial.
Figure 2:
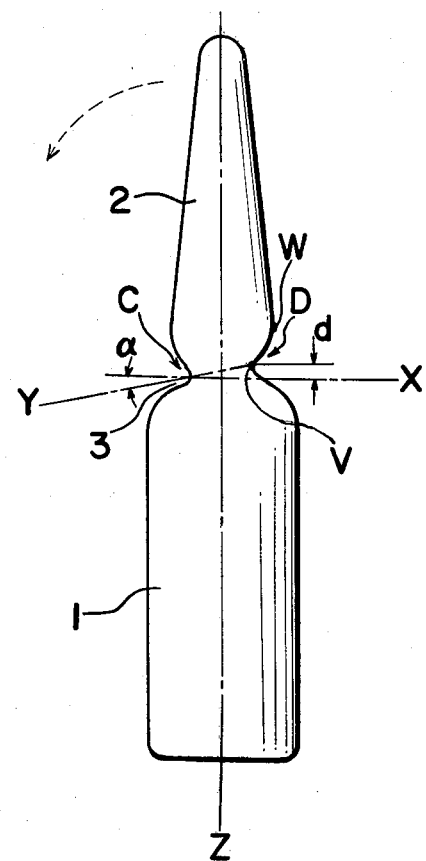
FIG. 2 is a side view of a vial of the present invention.
Figure 6:
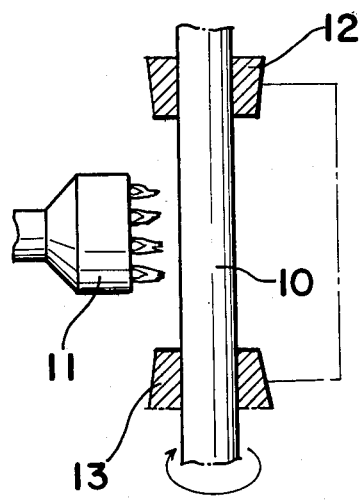
FIGS. 6 to 11 are schematic views, for the purpose of facilitating the explanation of the production of the vial, showing the portions of apparatuses for use in the production of the vial according to the present invention.
Figure 7:
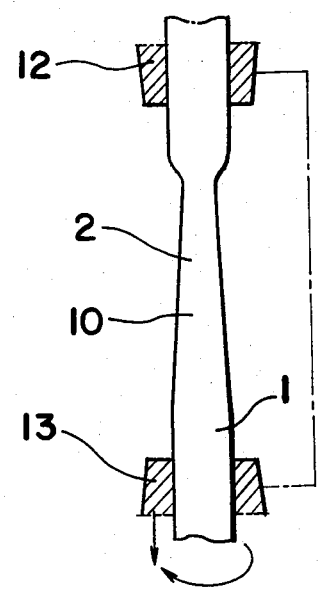
Figure 8:
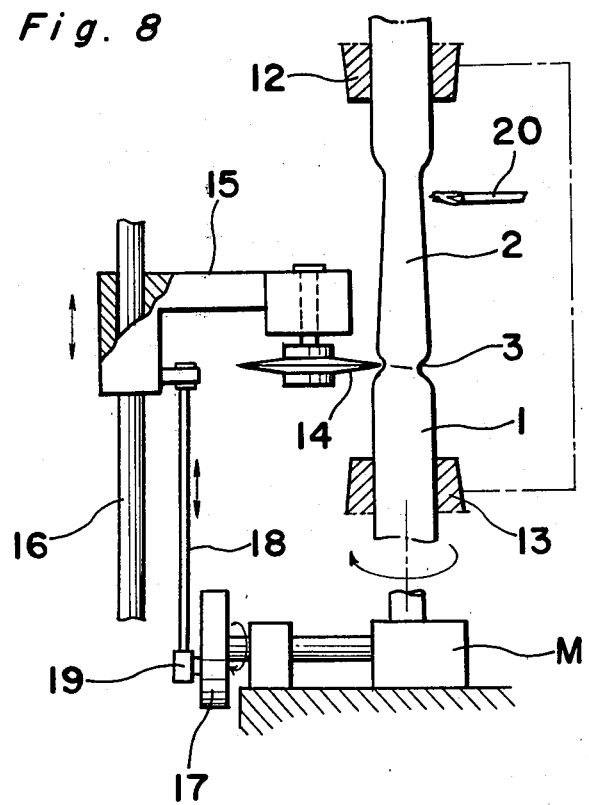
Figure 9:
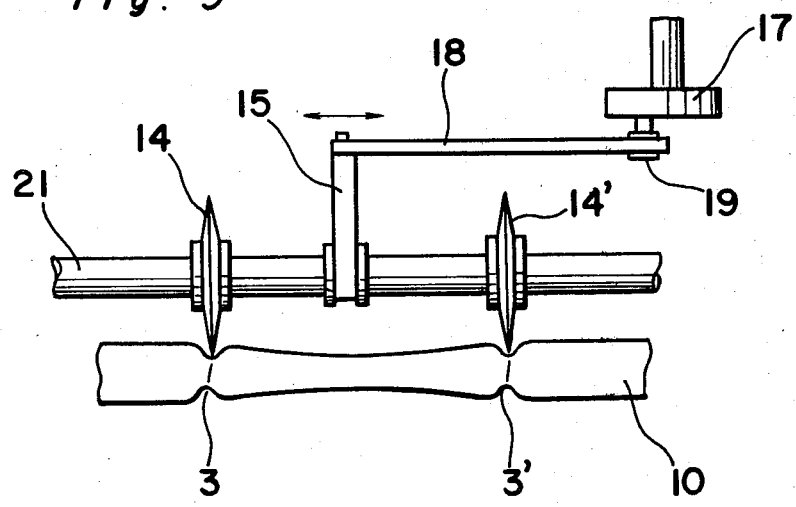
Figure 10:
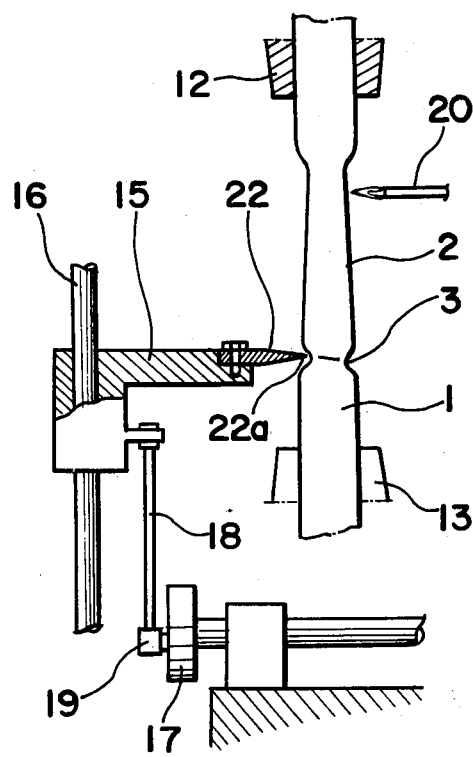
Figure 11:
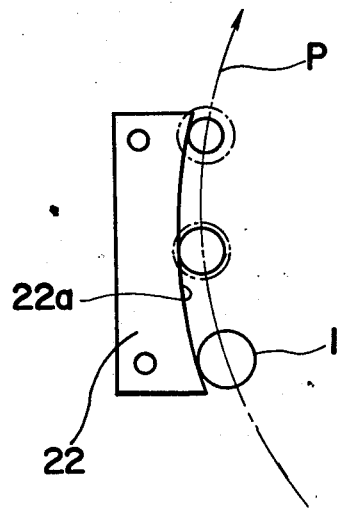

Referring to FIG. 2, the glass vial of the present invention has a plane C-D (imaginary), along the narrowest, innermost portion of a vial neck portion 3, which defines a cut line whereby a branch pipe portion 2 can be obliquely or diagonally broken from the main body 1 of the vial with respect to the horizontal reference line of the vial. The obliquely or diagonally disposed cut line Y(C-D) is inclined at an angle α of approximately 5° through 25° with respect to a horizontal reference line X which is normal to the vertical central axial line Z of the vial body 1 of FIG. 2. Preferably an angle of approximately 5° through 15° is optimum. In the case of the normal glass vial for hypodermic purposes, the outer diameter of the neck portion is approximately 6 mm. The inclined angle can be represented as the length d between the lowest portion and the highest portion with respect to the central axial line Z of the cut line of FIG. 2. The preferable range of the d in this case if 0.5 through 2.5 mm. Preferably 0.5 through 2.0 mm has been found to be optimum. When the inclined angle α is 5° or less, the difference was not big in shape as compared with known vials. Also, considerable functional effects could not be found in terms of the controlling operation of the broken glass pieces. Also, in the case of 25° or more in the inclined angle α, the vial becomes difficult to make, and the slipping of the axial line in the barrel portion and the branch pipe portion becomes larger, thus resulting in difficulty in the entire handling operation of the vial. The glass vial of the present invention is produced by the employment of an apparatus as shown in FIGS. 6 to 11 from a glass pipe 10 of length sufficient to provide the main body 1 and branch pipe portion 2 of a vial in association with a slanting cut line Y for cutting the branch pipe portion 2 from the main body 1. At first, the glass pipe 10 is heated up by a burner 11 to bring it up to a temperature state capable of molding for changing its shape. While holding both ends of the glass pipe by means of a pair of chucks 12, 13, it is rotated at a constant speed by a motor (not shown) in a conventional known manner, as shown in FIG. 6. The pair of chucks 12, 13 are rotated together with the glass pipe 10 until the molding of the vial is completely finished. Then, one of the chucks, for instance, the lower chuck 13 is downwardly shifted by a known reciprocating mechanism (not shown) for a certain distance to extend the glass pipe 10 so as to form a slender portion to be adapted as the branch pipe portion 2 of a vial, as shown in FIG. 7. Thereafter, the pair of chucks 12, 13 are moved by a known guide means (not shown) toward a molding roller 14 to provide the narrowest part of the slanting cut line Y at the neck portion 3 disposed between the slender portion, i.e., branch pipe portion 2 and the original stout portion to be adapted as a main body 1 of a vial, as shown in FIG. 8. The edge of molding roller 14 is forcebly attached with the neck portion 3 to form the narrowest part of the slanting cut line Y, which is rotatably supported by an arm 15 which is reciprocatingly moved up and down along a guide shaft 16 in parallel to the axial direction of the glass pipe 10 by the rotation of a cam 17 in synchronization with the rotation of the chucks 12, 13. A connecting rod 18 and an eccentric pin 19 are provided between the arm 15 and cam 17 which is rotated by a conventional driving means (not shown) at a speed synchronized with the rotational speed of the motor M for the chucks in such a manner that the molding roller 14 is adapted to reciprocate back and forward one circulation at every one rotation of the glass pipe 10 with respect to the one cycle motion of the connecting rod 18. The degree of slanting angle α for the narrowest part of the slanting cut line Y is varied depending upon the stroke for the reciprocating motion of the molding roller 14, so that the narrowest part of the slanting cut line Y with the desired amount of slanting angle α is obtained by positioning the eccentric pin 19 at the various places on the cam 17 if and when providing an adjusting means (not shown) for changing the position of the pin 19 in a known manner. Finally, the upper and lower parts of the glass pipe 10 are separately cut by a cutting burner 20 to obtain a vial having a main body 1 and a branch pipe portion 2 while providing the narrowest, innermost part 3 of the slanting cut line Y therebetween. The vial is completely sealed at both ends of the upper and lower parts after introducing the medical solution into the main portion 1 of the vial, in a known manner. Also, a mark for showing the slanting cut line Y such as a V shaped concave scratch V or color display point W is provided on the branch pipe portion 2 of the vial in a conventional manner. As a modification in the apparatus for the mass-production of the vials, a plurality of the molding rollers 14, 14' can be horizontally or vertically provided on the arm 15 through a supporting shaft 21 to move as a unit towards the glass pipe 10 in order to form the narrowest part of the slanting cut lines Y on the corresponding portions of the glass pipe 10 at the same time, as shown in FIG. 9. Also, the molding roller can be replaced by a cam plate 22 having a mold edge 22a a length sufficient for being forceably attached to the neck portion 3 of the vial to form the narrowest part of the slanting cut line Y in the same manner as above-mentioned with the molding roller 14 during the movement of the vial along a pass P facing the molding edge 22a of the cam plate 22, as shown in FIGS. 10 and 11.

To cut the vial of the present invention, it is required to break the branch pipe portion 2, along the direction of a cut line Y shown with a dotted-line arrow, at the narrowest part of the vial neck portion 3 of FIG. 2. Accordingly, to cut the vial, the scratch is required to be provided in advance, with a file, on the highest portion of the cut line Y, i.e., at the position D of FIG. 2 and the vial branch pipe portion 2 is required to be bent and cut in the direction of the dotted-line arrow from the side of the highest portion D to the side of the lowest portion C. Even when a scratch for the cut is provided in advance during the molding of the vial as in the above-described one-dot-cut vial, the location where the scratch is given is the same as described hereinabove. The scratch for the cut is a V-shaped concave portion V of a short length along the peripheral direction. By providing a color display point W on the branch pipe portion located above the concave portion V, the cut line can be clearly identified. Thus, the vial of the present invention is desired to have instructions, to be observed during the cutting operation, displayed on the proper portion of the vial and/or on one portion of the wrapping box.

Figure 3:
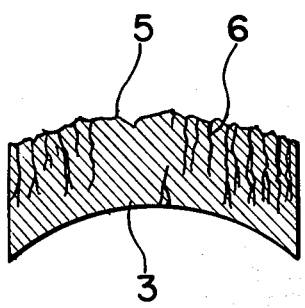
FIG. 3 is an enlarged plane view of a cut face on the compression side (A portion of FIG. 1) of the known vial.
Figure 4:
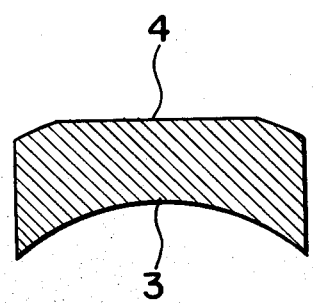
FIG. 4 is an enlarged plane view of a cut face on the tensile side (B portion of FIG. 1) of the same known vial.
Figure 5:
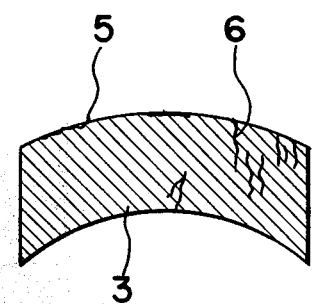
FIG. 5 is an enlarged plane view of a cut face on the compression side (C portion of FIG. 2) of a vial of the present invention.

When the vial of the present invention has been cut by the method as described hereinabove, the vial is broken along the narrowest part of the neck portion 3 along a cut line Y shown with the one-dot chain line of FIG. 2 to separate the branch pipe portion 2 from the main body 1 of the vial. In this case, the highest portion D of the cut line Y is located on the tensile side, but the lowest portion C of the cut line corresponding to the compression side is positioned at a different location from the known devices. The stress, caused during the cutting operation, working upon this portion is dispersed in the direction indicated with the cut line Y of the one-dot chain line, and apparently functions as a tensile force. Although the cut face is located on the compression side as apparent from FIG. 5, the cut face is reduced in the number of the break lines and is definitely clear as the cut face (see FIG. 4) on the tensile side as compared with the cut face (see FIG. 3) of known vials. Accordingly, it is true that the broken glass pieces produced from this portion are considerably reduced in number.

The present inventors also examined the size and number of the broken glass pieces of a vial of 2 ml in capacity in accordance with the present invention, which were caused when the vial was cut with cut lines having various inclined angles (5°, 11°, 22°). The results thereof are shown in Table 2. The cutting operation was effected after one-dot file scratch had been given to the D portion of FIG. 2 in accordance with the known one-dot cut vial.

Table 2 shows that the broken glass pieces of the vial of the present invention caused during the cutting operation were reduced in number to approximately one third as compared with those of the known example.

As described hereinabove in detail, the present invention is extremely useful in practical use, since the shape is characteristic and the functional effects are also considerable.

In addition to the construction of the present invention, by properly adopting the above-described known means, the pollution of the contents caused by the broken glass pieces during the cutting operation can be further reduced. Also, the glass thickness of the highest portion of the cut line of the vial in accordance with the present invention can be made thinner to simplify the cutting operation and to decrease the number of the broken glass pieces caused during the cutting operation.

Although the present invention has been described and illustrated in detail, it is to be clearly understood that the same is by way of illustration and example only and is not to be taken by way of limitation, the spirit and scope of the present invention being limited only by the terms of the appended claims.

TABLE 2

| Experiments No. | Inclined Angles α | | | | | | | | |
|---|---|---|---|---|---|---|---|---|---|
| | 5° (d* = 0.5 mm) | | | 11° (d* = 1.0 mm) | | | 22° (d* = 2.0 mm) | | |
| | Size Of Broken Pieces | | | | | | | | |
| | 10~24μ | 25~49μ | 50μ~ | 10~24μ | 25~49μ | 50μ~ | 10~24μ | 25~49μ | 50μ~ |
| 1 | 1 | 1 | 0 | 0 | 0 | 0 | 2 | 0 | 0 |
| 2 | 1 | 0 | 0 | 3 | 0 | 0 | 0 | 0 | 0 |
| 3 | 0 | 0 | 0 | 2 | 0 | 0 | 1 | 0 | 0 |
| 4 | 4 | 0 | 0 | 1 | 0 | 0 | 2 | 0 | 0 |
| 5 | 1 | 1 | 0 | 0 | 0 | 0 | 0 | 0 | 0 |
| 6 | 1 | 0 | 0 | 0 | 0 | 0 | 0 | 0 | 0 |
| 7 | 0 | 0 | 0 | 2 | 0 | 0 | 1 | 0 | 0 |
| 8 | 0 | 0 | 0 | 0 | 1 | 0 | 1 | 0 | 0 |
| 9 | 3 | 1 | 0 | 0 | 0 | 0 | 0 | 0 | 0 |
| 10 | 2 | 0 | 0 | 1 | 0 | 0 | 1 | 0 | 0 |
| 11 | 2 | 0 | 0 | 0 | 0 | 0 | 1 | 1 | 0 |
| 12 | 1 | 0 | 0 | 0 | 0 | 0 | 1 | 0 | 0 |
| 13 | 2 | 0 | 0 | 2 | 0 | 0 | 0 | 0 | 0 |
| 14 | 0 | 0 | 0 | 0 | 0 | 0 | 0 | 0 | 0 |
| 15 | 1 | 0 | 0 | 0 | 0 | 0 | 3 | 0 | 0 |
| 16 | 1 | 0 | 0 | 1 | 0 | 0 | 1 | 1 | 0 |
| 17 | 0 | 1 | 0 | 0 | 0 | 0 | 0 | 0 | 0 |
| 18 | 1 | 0 | 0 | 0 | 0 | 0 | 3 | 1 | 0 |
| 19 | 1 | 0 | 0 | 1 | 0 | 0 | 0 | 0 | 0 |
| 20 | 0 | 0 | 0 | 1 | 0 | 0 | 1 | 0 | 0 |
| $\bar{X}$ | 1.1 | 0.2 | 0 | 0.7 | 0.05 | 0 | 0.9 | 0.15 | 0 |
| Total $\bar{X}$ | 1.3 | | | 0.75 | | | 1.05 | | |

(vial capacity 2 ml)
*size of d of FIG. 2

What is claimed is:

1. A glass vial having a main body, a branch pipe portion and an intermediate neck portion disposed therebetween, said neck portion containing indentation portions which are off-set relative to each other and a cut line provided at the intermediate neck portion for cutting the branch pipe portion of the vial from said main body thereof, said cut line being diagonally oriented with respect to a horizontal reference line which is normal to the central axis of the main body of the vial, said diagonal orientation of the cut line being positioned by connecting the innermost portions of said off-set indentations with said cut line.

2. The glass vial described in accordance with claim 1 wherein the inclined angle of said cut line relatiave to the horizontal reference line is set in the range 5°–15°.

3. The glass vial described in accordance with claim 1 wherein the distance between the innermost portions of the off-set indentations as measured in the direction of the central axis of the main body of the vial is 0.5 to 2.5 mm.

4. The glass vial described in accordance with claim 1 wherein the inclined angle of said cut line relative to the horizontal reference line is set in the range of 5° through 25°.

5. The glass vial described in accordance with claim 1 wherein a scratch for cutting is provided at the highest portion of said cut line.

6. The glass vial described in accordance with claim 1 wherein the thickness of the lowermost portion of said cut line is thinner relative to the uppermost portion.

* * * * *